Oct. 28, 1924.

E. E. WEMP

CLUTCH

Filed Nov. 28, 1921

Center of Gravity

INVENTOR.

Ernest E. Wemp

BY Stuart C. Barnes

ATTORNEY.

Patented Oct. 28, 1924.

1,513,203

UNITED STATES PATENT OFFICE.

ERNEST E. WEMP, OF DETROIT, MICHIGAN.

CLUTCH.

Application filed November 28, 1921. Serial No. 518,234.

*To all whom it may concern:*

Be it known that I, ERNEST E. WEMP, a citizen of the United States, residing at Detroit, in the county of Wayne and State of Michigan, have invented certain new and useful Improvements in Clutches, of which the following is a specification.

This invention relates to clutches and has for its object an improved clutch of the multiple disk type.

Among the objects of this invention is a multiple disk clutch having separate pressure releasing levers that are nicely balanced and arranged so that centrifugal forces generated by great speeds do not materially interfere with the action of the clutch. This will be more fully explained after the specific structure is described.

Another feature of this clutch is the use of a yieldable pressure-equalizing ring which secures an even distribution of the spring pressure to the disks.

Still another feature of this clutch is the design of the driving disks so as to provide a heat reservoir and thereby enlarge the heat-conducting capacity of the disk by permitting the heat to be conducted both toward the outside and the inside of the disks.

Still another novelty found in this clutch construction is the design of the abutment ring which is stamped to provide suitable fulcrums and supports for the pressure-releasing levers.

In the drawings.—

Figure 1:
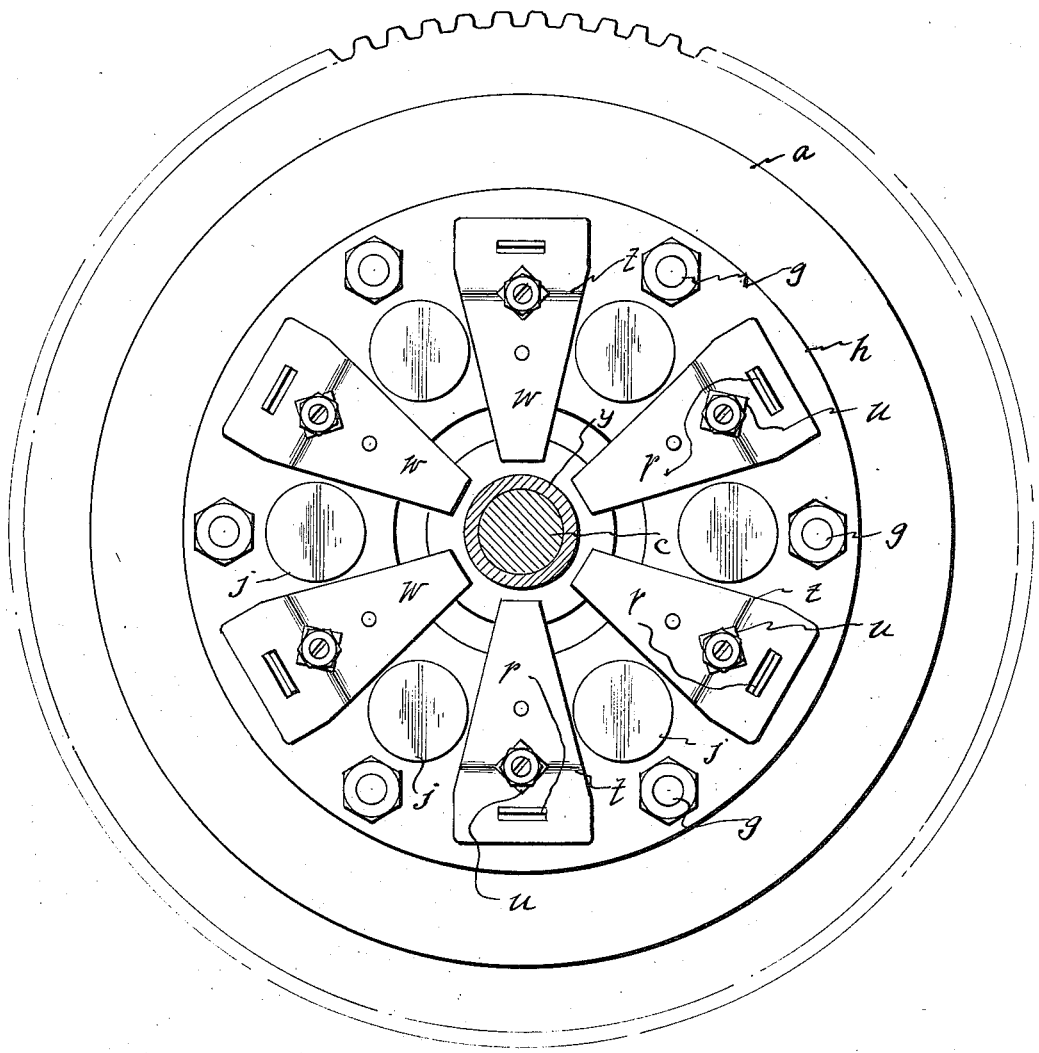
Fig. 1 is an elevation of the back of the clutch,—that is, looking at the clutch forward along the driven shaft.

$a$ designates the usual fly wheel connected with the end of the driving shaft $b$. The driven shaft $c$ is supported on the ball bearings $d$ in the fly wheel. The driving disks are designated $e$ and $f$. Only two are found necessary in my clutch although a different number may be used. These are connected in slidable but driving relation with the fly wheel by means of the large studs $g$, which also support the abutment ring $h$ upon the ends of the studs. A plurality of clutch springs $i$ are supported in the abutment ring in the spring cups $j$ and these bear against the pressure ring $k$ which is attached to the outer driving disk $f$ by the screws $m$. This pressure ring $k$ can move slightly on the screws $m$.

Interposed between the pressure ring and the outside driving disk is a yielding pressure-equalizing ring $n$, preferably of cork. It is not always possible to get the faces of the driving disk $f$ and the metal pressure ring $k$ so that they both meet in identically the same plane, that is, they may bear together at one point and be clear of each other at another point due to slight irregularities in construction. In this event, if pressure is applied to pack the disks at one point and no pressure at another, it gives an uneven clutch action. By using the pressure-equalizing ring $n$ between the pressure ring and the first driving disk, this uneven distribution is avoided notwithstanding irregularities in the faces of the ring and disk.

In the embodiment of my clutch shown in the drawings the spring pressure is afforded by a plurality of direct pressure coiled springs. This is one type of spring means. A single coiled spring about the driven shaft is another common type of spring means. Where the individual springs are used around the abutment ring the levers take the character of pressure-releasing levers. When the single clutch spring is used around the driven shaft the levers take the character of pressure-transmitting levers. Hence I desire it to be understood that I claim these levers both as pressure-communicating and pressure-releasing levers. Hence in the claims they will be designated simply as levers to cover their use.

Figure 5:
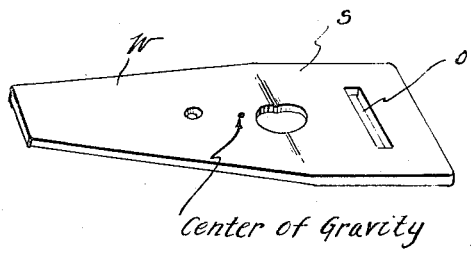
Fig. 5 is a perspective of one of the pressure-releasing levers.
Figure 6:
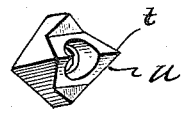
Fig. 6 is a detail of one of the nuts that has a knife edge engagement with the pressure-releasing lever.

These levers are provided with slots $o$ which enable the lever to be dropped over the post $q$ and to rest on the fulcrum $r$. This post $q$ and fulcrum $r$ are simply a sort of inverted T shape lug stamped out of the material of the abutment ring $h$ and turned up. The post $q$ holds the lever in place while the fulcrum serves as a fulcrum for the lever. Very close to the center of gravity, as indicated in Fig. 5, the lever is stamped in to form a V bearing s for the knife edge t of the nut u secured on the end of the bolt v. The inner end of this bolt has a part-spherical head and bearing in the punched-in sockets of the pressure ring k. The coiled spring x bears between the pressure ring and the washer and the lever w to normally keep the levers spaced from the pressure disk and yieldingly forced against the nuts u. The levers are stampings and are made of spring steel so that they may flex slightly. If one is set a little ahead of the other it will bend slightly to more evenly distribute the load among all the levers.

Figure 2:
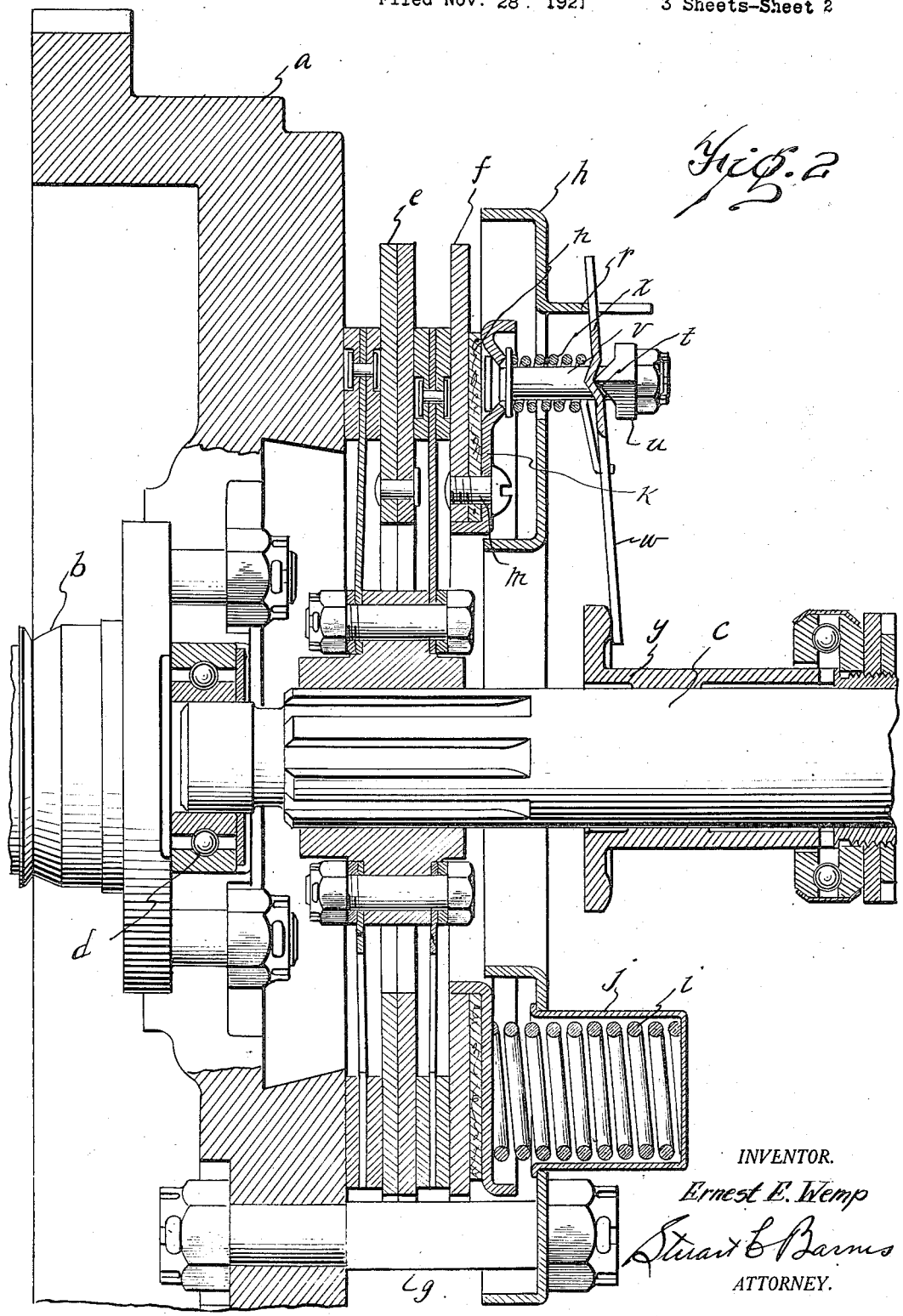
Fig. 2 is a cross section of the clutch and the adjoining parts.
Figure 3:
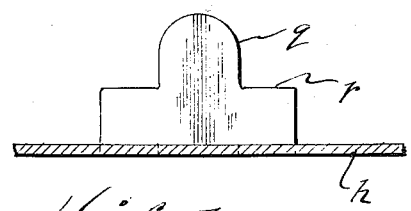
Fig. 3 is a section taken on the line 3—3 of Fig. 4.
Figure 4:
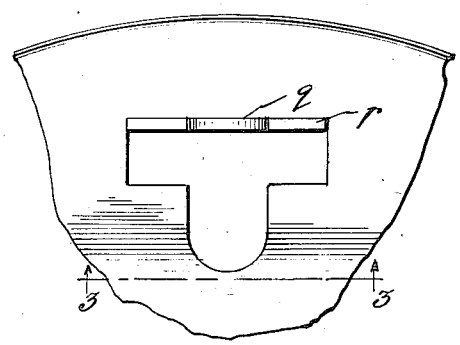
Fig. 4 is a fragmentary elevation of the abutment ring showing one of the fulcrum supports.

The clutch-shifting collar is designated y. It is of course, provided with the usual clutch-shifting fork (not shown). By shifting the clutch collar to the right in Fig. 2, the clutch will be released. The levers w act as levers of the second order with the fulcrum at r and with the load point between the fulcrum and the point of application of the power. The multiplication of the force is something like from five to one, depending, of course, upon the spacing of the fulcrum, load, and power points.

In connection with the individual levers of this type it is quite necessary that they be properly designed to counterbalance the centrifugal forces and also that the center of gravity be as little removed angularly as possible from a perpendicular line from the shaft through the fulcrum point. It is necessary to provide for the wear of the clutch facings, hence initially it is advisable to have the levers with their power ends slightly to one side of this perpendicular line. As the wear of the faces continues the levers will come to a perpendicular position and then to a position slightly to the other side of the perpendicular. With the center of gravity of the lever and the fulcrum defining a straight line perpendicular to the axis of the shaft the centrifugal forces have no right angular component tending to either pack the disks together with more pressure or tending to release the disks. However, with the center of gravity at a considerable angle to a perpendicular line from the shaft through the fulcrum, as is the case with many levers of this type, there exists a centrifugal force having a large component working to either release the disks or pack them tighter, depending upon which side of the perpendicular the center of gravity is and also depending upon the angle. With my lever I have so designed it as to, as near as may be, get the center of gravity very near to the perpendicular from the shaft to the fulcrum point, thereby keeping down the size of the component tending to diminish or increase the pressure. At the same time I have also neutralized this component by proportioning that portion of the lever beyond the fulcrum point so that its moment is substantially equal and opposite to the moment of the lever to the inside of the fulcrum. The lever is substantially counterbalanced. I prefer, however, to have any lack of true counterbalance exist in the way of want of complete counterbalance rather than excess for then the slight uncounterbalanced right angular component of the centrifugal forces tends rather to slightly diminish the pressure than slightly to increase the pressure on the clutch disks. I have found that with the center of gravity at substantially the point indicated in Fig. 5, I get substantially the results which I have outlined.

Figure 7:
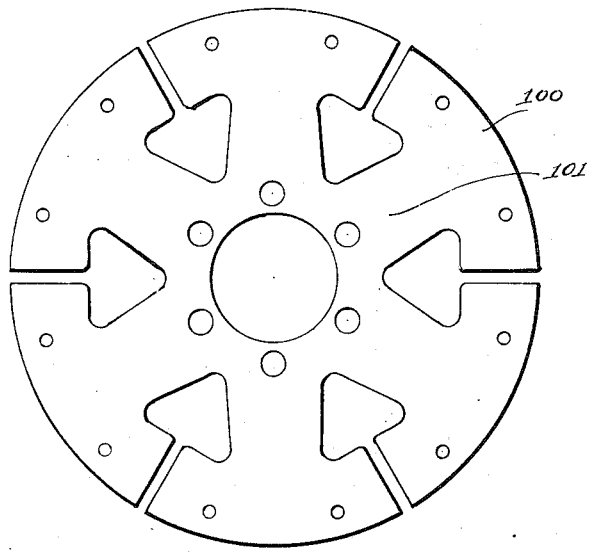
Fig. 7 is a detail of one of the driven disks.

Now by mounting the facings of the driven disks 100 of the clutch upon flexible webs 101, such as shown in Fig. 7, it is possible to extend the driving disks to the inside of the facings of the driven disks. I find that with a given thickness of the metal of the driving disk it is only possible for a certain amount of heat to escape to the outside of the driving disk in a given unit of time. In other words, the rate of heat dissipation depends upon the cross section of the path left for the heat to the outside of the disk. Hence even though the disk be extended outward a considerable distance, it is of little value, because only so much heat can reach the cooling portion of the disk as is permitted by the cross section of the conductor. It is, however, undesirable to make the driving disk too thick both because of the cost and also the difficulty in stamping a heavy disk. I have met the situation by providing what I term heat reservoirs for these metal disks to the inside of the clutch facings. This provides two paths for the heat dissipation, one in and one out, and consequently doubles the cross section of the conductor without increasing the thickness of the disk. This greatly increases the heat dispersion from the clutch facings at the time of greatest heat generation when the conducting line to the outside of the disk would otherwise be choked by the generation of more heat than it was able to convey away. As the peak of the heat generation subsides the heat retained in the reservoir portion of the disk may now be dispersed outwardly through the outer conductor, which now has capacity to convey it to the cooling sections of the disk.

In claiming this disk I find it convenient to roughly divide the disk into three theoretical sections. That portion immediately adjacent the clutch facings will be termed the heat-generating or working surface of the disk; that portion to the inside of this section will be termed the heat reservoir section of the disk; that portion to the outside of the working section will be called the heat-dissipating section of the disk.

What I claim is:

1. In a multiple disk clutch, the combination of a plurality of disks with clutch facings, and a plurality of disks each having heat-dissipating portions and also heat reservoir portions.

2. In a multiple disk clutch, a plurality of disks with clutch facings and disks, each provided with an outer heating-dissipating section, an intermediate working section, and an inner heat reservoir section calculated to relieve the excessive accumulation of heat at the facings.

3. In a multiple disk clutch, the combination of driven disks provided with clutch facings supported on flexible webs, and driving disks each having a section projecting to the outside of the clutch facings acting as a heat-dissipating section, a working section immediately adjacent the clutch facings, and a section projecting to the inside of the working section acting as a heat reservoir section.

4. In a multiple disk clutch, a plurality of driven disks having clutch facings, and a plurality of driving disks of metal extending both outwardly beyond and inwardly beyond the clutch facings of the driven disks to form heat-dissipating sections on the outside and heat reservoir sections on the inside of the clutch facings.

5. In a multiple disk clutch, a plurality of driving and driven disks alternately arranged, one set of each provided with facings and the alternate set extending both outwardly and inwardly beyond the area of the facings to provide heat absorbing and dissipating means.

6. In a multiple disk clutch, the combination of a plurality of driving and driven disks, means for supplying pressure to pack the same, and a cork ring between such pressure-supplying means and the disks for equalizing the pressure distribution.

7. In a multiple disk clutch, the combination of a plurality of driving and driven disks, a metal pressure ring, and a cork ring between the pressure ring and the disks.

8. In a multiple disc clutch, a plurality of driving and driven members, one of the driving members being under spring thrust for packing the said members, a plurality of levers for operating in connection with the thrust, said levers pivotally supported by one of the driving members and having their centers of gravity located in approximately a plane through the fulcrums of the levers and perpendicular to the axis of rotation of the clutch parts, the said centers of gravity being removed inwardly from the fulcrums, and each lever being counterbalanced beyond the fulcrum to neutralize angular components of the centrifugal forces existing by reason of any deviation of the center of gravity from such perpendicular plane, and ties connecting said levers with the driving member under spring thrust.

9. In a multiple disk clutch, a plurality of driving and driven disks, and a plurality of levers operating in connection with the disks and shaped, dimensioned and placed to have the center of gravity arranged initially slightly to the rear of a perpendicular line between the fulcrum point and the axis of the clutch and gradually to pass the perpendicular to the front of the same as the clutch wears.

10. In a multiple disk clutch, a plurality of driving and driven disks, and a plurality of levers operating in connection with the disks, said levers shaped, dimensioned and placed to have the center of gravity of the lever only slightly angularly removed to the rear of the perpendicular through the fulcrum and axis of the clutch initially and passing gradually to the front of such perpendicular position as the clutch wears, the said levers being provided with counterbalancing portions extending outwardly from the fulcrum and which have a moment under the centrifugal forces substantially equal to the moment of the lever portion to the inside of the fulcrum.

11. In a clutch, the combination of a plurality of driving and driven members including a plurality of discs, one of the discs being under immediate spring thrust, and a plurality of levers having tie connections with the disc under spring thrust for releasing said disc, said levers pivotally supported on one of the driving members and being both, located in substantially a plane perpendicular to the axis of the clutch parts, and counterbalanced for eliminating as far as possible centrifugal forces tending to pack or unpack the discs and for counterbalancing such centrifugal forces as may exist.

12. In a clutch, the combination of driving and driven members and a plurality of sheet metal levers operating in connection with said members, the levers provided with slots adapted to position the fulcrum points of the levers and having counterbalancing portions extending outwardly from the slots.

13. In a clutch, the combination of driving and driven members and a plurality of flexible sheet metal levers operating in connection with said driving and driven members, the levers provided with slots adapted to position the fulcrum points of the levers and having counterbalancing portions extending outwardly from the slots.

14. In a multiple disk clutch, the combination of a plurality of driving and driven disks, an abutment ring having struck-out portions, and levers operating in connection with the disks, the said levers being fulcrumed on the struck-out portions of the abutment ring.

15. In a multiple disk clutch, the combination of a plurality of driving and driven disks, an abutment ring provided with struck-out portions forming fulcrum supports with intervening post portions, and levers, operating in connection with the disks, provided with slots adapted to be fitted over the post portions of the struck-out portions of the ring to support the levers on the fulcrum supports.

16. In a multiple disk clutch, a plurality of driving and driven disks, a pressure disk, a plurality of studs connected with the pressure disk, nuts secured on the studs, and a plurality of pressure releasing levers, the said levers and nuts engaging by a knife edge on one of the members engaging a bearing on the other member of each pair.

17. In a multiple disk clutch, the combination of a plurality of driving and driven disks, a pressure ring, a plurality of studs projected rearwardly from said ring, nuts on the ends of the studs provided with contacting portions, and levers operating in connection with the disks and provided also with contacting portions, some of the contacting portions being knife edges.

18. In a multiple disk clutch, the combination of a pressure ring, an abutment ring, one or more springs tending to force the pressure ring away from the abutment ring, and levers fulcrumed on the back of the abutment ring and having load portions tied to the pressure ring, whereby the levers serve to prevent the abutment ring and the pressure ring from completely separating under the spring pressure.

19. In a multiple disk clutch, the combination of a pressure ring and an abutment ring, one or more springs tending to force the pressure ring away from the abutment ring, levers fulcrumed on the back of the abutment ring, and tie bolts and nuts connecting the pressure ring and the levers whereby the levers serve to prevent the pressure ring and the abutment ring separating under the spring pressure when this unit of the clutch has not been assembled in connection with the other clutch parts.

20. In a multiple disk clutch, the combination of a driving disk, a pressure ring, a cushioning element in the form of an impressionable material permanently secured between the pressure ring, and the driving disk, spring means for thrusting the driving disk, the cushioning element and the pressure ring, and means for exerting a pull on said members to release said thrust.

21. In a multiple disk clutch, the combination of a plurality of driving and driven disks, a pressure ring, a plurality of studs projecting rearwardly from said ring and having nuts on their ends provided with knife edges, and a plurality of levers operating in connection with the disks and provided with portions adapted to bear against the knife edge portions of the nuts.

22. In a disc clutch, members arranged to form driving and driven discs, a clutch facing on the driven member and the driving member extending both outwardly beyond such facing and inwardly beyond such facing whereby a working section of disc is provided immediately adjacent the clutch facing, a heat reservoir section is provided to the inside of such working section and a heat-dissipating section provided to the outside of such facing.

In testimony whereof I affix my signature.

ERNEST E. WEMP.